Dec. 8, 1931. E. J. KEARNEY 1,835,782
MILLING MACHINE
Filed March 8, 1928   2 Sheets-Sheet 1
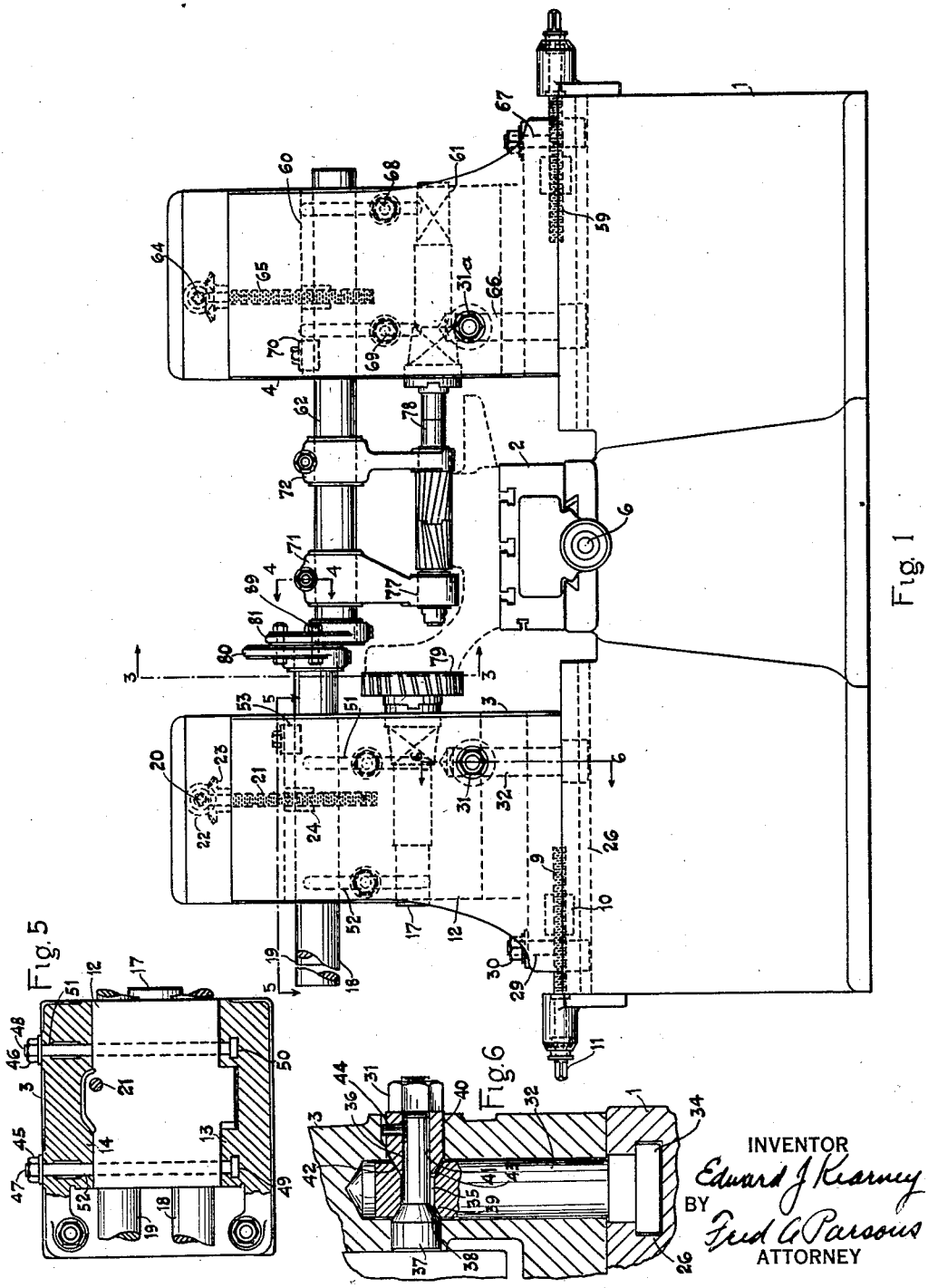
INVENTOR
Edward J Kearney
BY
Fred C Parsons
ATTORNEY

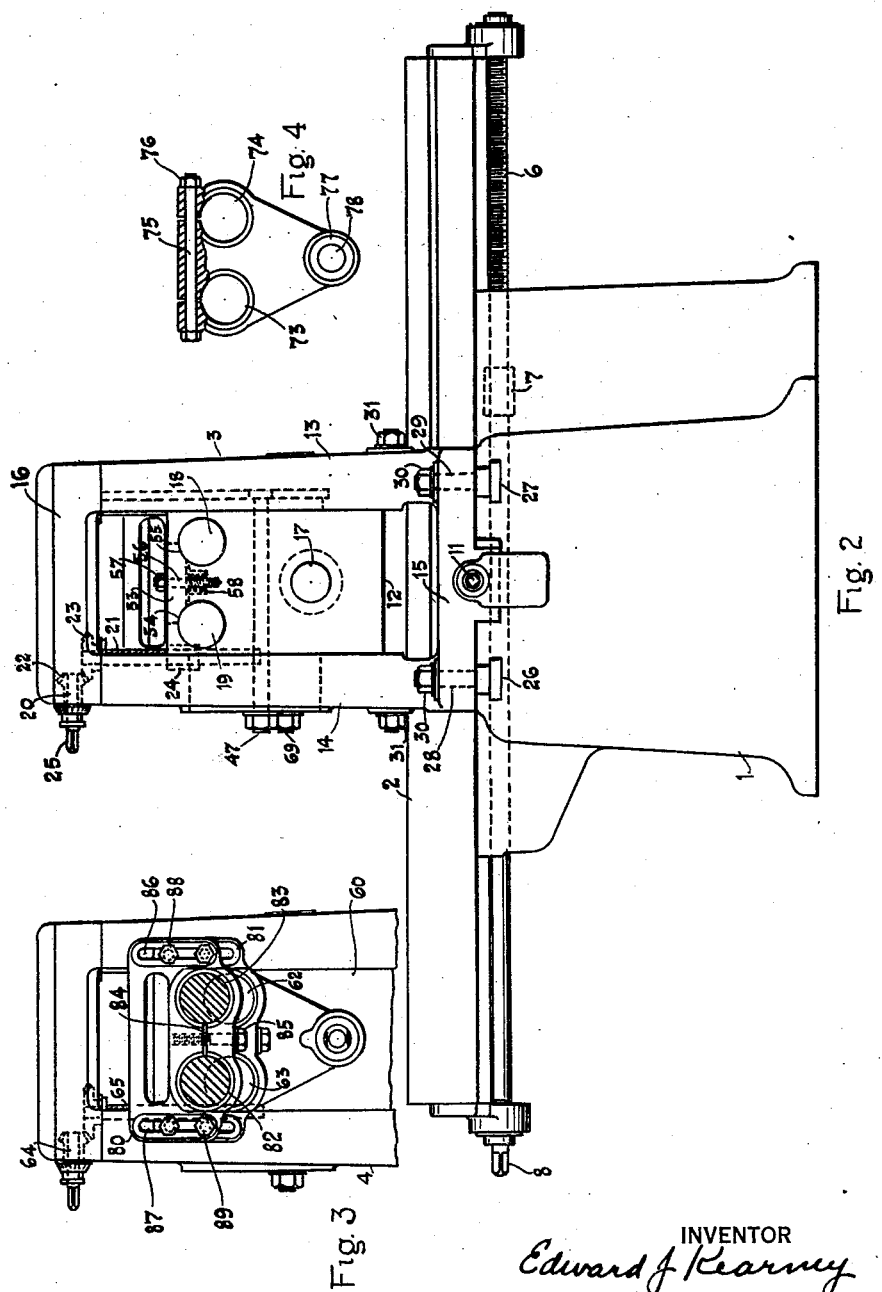

Patented Dec. 8, 1931

1,835,782

UNITED STATES PATENT OFFICE

EDWARD J. KEARNEY, OF WAUWATOSA, WISCONSIN, ASSIGNOR TO KEARNEY & TRECKER CORPORATION, OF WEST ALLIS, WISCONSIN

MILLING MACHINE

Application filed March 8, 1928. Serial No. 260,106.

This invention relates to milling machine structure, and more particularly to a structure providing convenience of adjustment together with great rigidity in certain types of milling machines.

A purpose of the invention is to provide an improved milling machine in which the work table travels in a horizontal path and relative vertical adjustment of the work and tool is obtained by moving the tool spindle.

A further purpose is to provide in such a machine a plurality of tool spindles arranged with the individual supporting structures on opposite sides of the work table, and each independently adjustable in vertical paths.

Another purpose is to provide in such two spindle machine improved means whereby the independent spindle supporting structures at times may cooperate for the mutual support of both spindles or both structures may cooperate to support either spindle.

Another purpose is to improve the overarm structure of such two spindle machines, and to provide means whereby the overarm structure individual to the different spindles may cooperate for support of either or both spindles and for establishing a unitary structure having convenience for spindle adjustment combined with great rigidity.

Another purpose is generally to improve and simplify the construction and operation of milling machines, and still other objects will be apparent from this disclosure.

The invention consists in the particular construction, arrangement and combination of parts as herein illustrated and described and in such modifications thereof as may be equivalent of the mechanism claimed.

In the drawings the same parts have the same reference characters throughout.

Fig. 1 is a side elevation of a two spindle milling machine in which the invention is incorporated.

Fig. 2 is an end elevation of the same machine.

Fig. 3 is a partial elevation, partially in section along line 3—3 of Fig. 1.

Fig. 4 is a partial section taken along line 4—4 of Fig. 1.

Fig. 5 is a partial section taken along line 5—5 of Fig. 1.

Fig. 6 is a partial section taken along line 6—6 of Fig. 1.

The machine comprises a stationary base 1 upon which is slidably guided a reciprocable work table 2, and reciprocable spindle supporting heads 3 and 4 arranged on opposite sides of the table and movable in mutually parallel paths transverse to the table movement. The table 2 may be traversed by the means of a screw 6 journaled in the table but fixed against axial movement relative thereto and engaging a nut 7 fixed in bed 1, the screw being provided with a squared end 8 for a suitable crank, not shown.

The head 3 may be traversed by the means of a screw 9 journaled in the bed, but prevented from axial movement and engaging a nut 10 fixed in the head, the screw having a squared end 11 for a suitable crank, not shown.

The head 3 has a spindle carrier or member 12 guided for vertical adjustment between two upright portions 13, 14, which are connected by a bottom portion 15 and a top portion 16. Member 12 carries a rotatable tool spindle 17, and a plurality of round overarms 18, 19, each axially adjustable through carrier bores in which they are fitted. The carrier 12 may be vertically adjusted by the means of a shaft 20, connected with a vertical screw 21 by the means of bevel gears 22—23, the screw being fixed against axial movement and engaging a nut portion 24 fixed with carrier 12. Shaft 20 has a squared end 25 for a crank not shown.

Head 3 may be clamped in any position of its adjustment by the means of bolts engaging suitable T slots 26, 27, in bed 1. One pair of bolts 28, 29, are of ordinary construction with nuts 30, 30. Another pair of bolts are of a construction suitable to permit the nuts 31, 31, to stand at the side of the head, the construction of one of such bolts 32 being shown in Figs. 1 and 6 and the other being exactly similar. As seen in Fig. 6 bolt 32 has a T head 34 sliding in T slot 26 and a transverse bore 35 at its upper shank end, through which a rod 36 extends outside head 3 and threadedly engages nut 31. Rod 36 has an enlarged head 37, slidably fitting a bore in head 3, and having a conical portion 38 engaging a complementary conical socket 39 in the bore 35. A sleeve 40 is slidably fitted in a suitable bore in the head 3 and has a bore 41 in which rod 36 is slidably fitted, the sleeve having a conical end 42 engaging a complementary conical socket 43 in the bore 35. Sleeve 40 and rod 36 are prevented from turning by a pin 44 engaging the head 3. The conical portions of rod 36 and sleeve 40 are forced toward one another by suitably turning nut 31, forming oppositely disposed wedges tending to lift bolt 32, there being clearance in the underside of the conical sockets such that the T head of bolt 32 engages the T slot before the conical portions seat in the sockets, thereby clamping the head 3.

The construction whereby nut 31a may also clamp the head 4 is exactly similar to that just described for clamping the head from nut 31.

The carrier 12 may be clamped in any position of its vertical adjustment by the means of nuts 45, 46, threaded on T bolts 47—48 which engage T slots 49 and 50 in the head 3, the bolts being slidably fitted in suitable bores in the carrier, and the head 3 having slots 51, 52, permitting vertical movement.

Each of arms 18, 19, may be clamped in any position of their adjustment in their carrier bores, there being a clamp member 53 slidable in a suitable socket in the carrier and having portions 54, 55, arranged to contact and clamp the arms simultaneously when the clamp member is suitably moved by the means of a bolt 56 and a nut 57. A spring 58 is arranged to free the clamp when the nut 57 is loosened.

Head 4 is of a construction exactly similar to head 3, there being a screw 59 arranged for head adjustment similarly to previously described screw 9, a spindle carrier 60 similar to carrier 12 and similarly provided with a rotatable tool spindle 61 and overarms 62, 63, a shaft 64 and vertical screw 65 arranged for vertical adjustment of carrier 60 similarly to previously described shaft 20 and screw 21, clamp means for head 4 including bolt 66 similar to bolt 32 and bolt 67 similar to bolt 28, clamp means for carrier 60 including bolts 68, 69, similar to bolts 47—48, and clamp means for overarms 62, 63, including a clamp member 70, for simultaneously clamping the arms and similar to clamp member 53.

The spindles 17—61, are each provided with suitable mechanism for spindle rotation and suitable power feed mechanism is used for movement of table screw 6, but since spindle and feed drive mechanism are well known in a great variety and form no part of the present invention they are not shown.

Either or both sets of overarms may be provided with pendants such as 71 and 72, Fig. 1, such pendants being provided with slotted bores such as 73 and 74, Fig. 4, slidably fitted on the overarms which may be contracted to rigidly clamp the pendant on the overarms, as for instance by the means of a bolt 75 and nut 76. Such pendants are also provided with a bearing or bore such as 77 in exact axial alignment with the spindle associated with the overarms upon which the pendant is clamped, whereby to exactly align and to support an arbor such as arbor 78.

In the drawings, only spindle 61 is shown with an arbor; the other spindle 17 illustrates a cutter 79 directly fixed on the spindle, but whatever may be the nature of the tools used, the rigidity of the spindle supporting structure is greatly increased by providing for mutual support of the one head from the other. This is accomplished by providing each pair of overarms with harness or tie members such as 80—81, Figs. 1 and 3.

In the present instance such members are similar and therefore only the member 80 will be described. A body portion is provided with bores as 82 and 83 slidably fitted to the overarm and slotted as at 84 for contraction by the means of a screw 85 for clamping the body portions rigidly on the overarm. Other portions fixed with the body portion are provided with slots as 86 and 87 adapted to receive bolts 88—89 which engage with the other harness member. The bolt slots of the two members are arranged to permit vertical adjustment of either carrier 12 or 60 when the bolts 88 and 89 are loosened, but when bolts 88—89 are clamped in any of the various positions of relative adjustment the different sets of overarms are rigidly clamped together. By then clamping the overarms in the carriers, the carriers are also rigidly clamped together, and by then clamping the carriers in the heads and the heads on the base, the parts all cooperate to provide a rigid unitary support for both spindles.

What is claimed is:

1. A milling machine comprising a reciprocable work table, a plurality of tool supporting heads respectively on opposite sides thereof, a plurality of rotatable spindles respectively carried by the different heads, a carrier supporting one of said spindles for vertical adjustment, an overarm supported from said carrier in fixed spacing from the last mentioned spindle, and means for rigidly securing said overarm both with said carrier and with the head which carries the other spindle, said means including different portions one of which is fixed with one of said heads and the other of which is associated with the other head and vertically movable with said carrier, said portions being adapted to be rigidly fixed together in various positions of vertical movement of said other portion.

2. A milling machine comprising a reciprocable work table, a plurality of tool supporting heads respectively on opposite sides thereof, a plurality of rotatable tool spindles respectively carried by the different heads, a carrier supporting one of said spindles for vertical adjustment, an overarm device supported from said carrier in fixed spacing from the last mentioned spindle for vertical adjustment therewith and for horizontal adjustment in a direction transverse to the path of table movement, an arbor fixed with said last mentioned spindle to project therefrom, a pendant fixed with said overarm device and providing a bearing for said arbor, said overarm device being adapted to restrain said bearing in axial alignment with said last mentioned spindle during said horizontal adjustment, and means for rigidly securing said overarm device both with said carrier and with the head which carries the other spindle, said means including different portions one of which is fixed with the last mentioned head and the other of which is associated with said overarm device and vertically movable with said carrier, said portions being adapted to be rigidly fixed together in various positions of the vertical movement of said other portion.

3. In a milling machine having a reciprocable work table and tool supporting heads respectively on opposite sides thereof, each of said heads having a vertically adjustable spindle carrier, the combination of overarms respectively vertically adjustable with the different carriers, and means to rigidly secure the one overarm with the other in different positions of relative vertical carrier adjustment.

4. A milling machine comprising a reciprocable work table, a plurality of tool supporting heads respectively on opposite table sides, each of said heads having a vertically adjustable spindle carrier, each of said carriers having an overarm vertically adjustable therewith, a harness device having portions respectively fixed with the different overarms, and means for clamping the one of said portions with the other in different positions of relative adjustment of said carriers.

5. A milling machine comprising a reciprocable work support, a plurality of upstanding heads respectively on opposite sides thereof, a plurality of vertically movable spindle carriers respectively associated with the different heads, a plurality of overarm devices respectively vertically movable with the different carriers and each including two overarms, a harness device including different portions respectively engaging both the overarms of the different overarm devices, and means for rigidly fixing the one portion of said harness device with the other.

6. A milling machine comprising a reciprocable work support, a plurality of tool supporting heads respectively on different sides thereof, a plurality of independently vertically adjustable spindle carrier units respectively associated with the different heads and each including a plurality of overarms, and a harness device including means for rigidly securing the overarms of the one unit with the overarms of the other unit in different positions of relative unit adjustment.

7. A milling machine comprising a reciprocable work table, a plurality of tool supporting heads respectively on opposite sides thereof, one of said heads being bodily adjustable in a direction transverse to the table path, a plurality of independently vertically adjustable spindle carriers respectively associated with the different heads, a plurality of overarms respectively vertically adjustable with the different spindle carriers, one of said overarms being independently adjustable in a direction parallel with the path of movement of said adjustable head, and harness means for fixing adjacent ends of said overarms together in various positions of carrier and head adjustment.

8. In a milling machine having a reciprocable work table and tool supporting heads respectively on opposite sides of said table, each of said heads having a vertically adjustable spindle carrier, the combination of a plurality of overarm devices respectively vertically adjustable with the different carriers and each horizontally adjustable, and means to rigidly secure the one overarm device with the other including different portions respectively fixed with the different overarm devices and adapted to be rigidly fixed together in various relative positions of vertical adjustment of said overarm devices, said overarm devices being adapted during horizontal movement thereof to restrain said portions in complementary paths of horizontal movement whereby to facilitate said fixing of the portions together.

In witness whereof I hereto affix my signature.

EDWARD J. KEARNEY.